United States Patent
Choi

(10) Patent No.: US 9,078,037 B2
(45) Date of Patent: Jul. 7, 2015

(54) ELECTRONIC APPARATUS WITH A SAFE CONDITIONAL ACCESS SYSTEM (CAS) AND CONTROL METHOD THEREOF

(75) Inventor: Myung-sik Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 13/617,599

(22) Filed: Sep. 14, 2012

(65) Prior Publication Data

US 2013/0166833 A1 Jun. 27, 2013

(30) Foreign Application Priority Data

Dec. 22, 2011 (KR) .................. 10-2011-0140610

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *H04N 21/442* | (2011.01) |
| *H04N 21/426* | (2011.01) |
| *H04N 21/443* | (2011.01) |
| *H04N 21/81* | (2011.01) |
| *G06F 21/57* | (2013.01) |

(52) U.S. Cl.
CPC ......... *H04N 21/4424* (2013.01); *H04N 21/426* (2013.01); *H04N 21/42692* (2013.01); *H04N 21/4435* (2013.01); *H04N 21/8193* (2013.01); *G06F 21/575* (2013.01)

(58) Field of Classification Search
None
See application file for complete search history.

(56) References Cited

U.S. PATENT DOCUMENTS

| | | | |
|---|---|---|---|
| 5,224,166 A | 6/1993 | Hartman, Jr. | |
| 7,451,460 B2* | 11/2008 | Birnbaum et al. | 719/328 |
| 8,352,372 B1* | 1/2013 | Swix et al. | 705/56 |
| 2005/0128520 A1* | 6/2005 | Glickman | 358/1.15 |
| 2008/0250228 A1* | 10/2008 | Elliott et al. | 712/205 |
| 2009/0187769 A1 | 7/2009 | Camiel | |
| 2012/0042157 A1* | 2/2012 | Leclercq | 713/2 |

FOREIGN PATENT DOCUMENTS

| | | |
|---|---|---|
| EP | 0961193 A2 | 12/1999 |
| EP | 1914990 A1 | 4/2008 |

OTHER PUBLICATIONS

Communication from the European Patent Office issued Jul. 25, 2014 in a counterpart European Application No. 12193458.2.

* cited by examiner

*Primary Examiner* — Andy Ho
*Assistant Examiner* — William C Wood
(74) *Attorney, Agent, or Firm* — Sughrue Mion, PLLC

(57) ABSTRACT

An electronic apparatus is provided, which includes a central processing unit (CPU), a first memory unit which performs communication with the CPU, and a second memory unit which stores therein conditional access system (CAS) software and platform software. According to the method of controlling the apparatus, upon booting, the CPU copies the CAS software to an internal memory area which may be within the CPU, copies the platform software to the first memory unit and executes the CAS and platform software, and executes CAS operations through communication between the CAS software and the platform software.

15 Claims, 5 Drawing Sheets

ELECTRONIC APPARATUS WITH A SAFE CONDITIONAL ACCESS SYSTEM (CAS) AND CONTROL METHOD THEREOF

CROSS-REFERENCE TO RELATED APPLICATIONS

This application claims priority from Korean Patent Application No. 2011-0140610, filed on Dec. 22, 2011, in the Korean Intellectual Property Office, the disclosure of which is incorporated herein by reference in its entirety.

BACKGROUND

1. Field

Apparatuses and methods consistent with the disclosure provided herein relate to an electronic apparatus and a control method thereof. More specifically, the apparatus and control method relates to an electronic apparatus applied with the Conditional Access System (CAS) and a control method thereof.

2. Description of the Related Art

The Conditional Access System (CAS) is a control system which exclusively provides broadcast contents to subscribers of a cable broadcast service, which provides the broadcast contents.

The conventional CAS system distributes the CAS software (or CAS client image) off-line, through the use of a smart card or PCMCIA card. Accordingly, when the CAS has an error, the error is not dealt with efficiently because it takes a predetermined amount of time to reissue the card. Furthermore, additional cost is required for the reissuance of the card.

Further, the CAS software is embedded in the platform software and is used to perform detection of hacking and forgery/falsification on the platform software. However, it is cumbersome because the developer of the platform has to directly include the CAS software when building the platform software. Further, the CAS software cannot be considered safe because the CAS software is exposed during building of the platform software.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one exemplary embodiment, a technical objective is to provide an electronic apparatus having a conditional access system (CAS) software which is safe against external hacking, forgery and falsification, and a control method thereof.

In one exemplary embodiment, an electronic apparatus may include a central processing unit (CPU), a first memory unit which communicates with the CPU, and a second memory unit which stores therein both conditional access system (CAS) software and platform software. Upon booting, the CPU copies the CAS software to an internal memory area, copies the platform software to the first memory unit and executes the software, and executes CAS operation through communication between the CAS software and the platform software.

The second memory unit may additionally store therein driver software, and the CPU may copy the driver software to the first memory unit and perform communication with the CAS software and the platform software through the driver software.

The CAS software may be implemented with encryption and electronic signature.

The CPU may decrypt the CS software, verify integrity through verification of the electronic signature, and then copy to the internal memory area.

The driver software may have an electronic signature, and the CPU may copy the driver software to the first memory unit and then verify integrity through verification of the electronic signature.

The first memory unit may be a random access memory (RAM), and the second memory unit may be a non-volatile memory, but are not limited thereto.

The internal memory area may be a secure random access memory (RAM) area inside the CPU.

The electronic apparatus may be implemented as a set-top box.

In one exemplary embodiment, a control method of an electronic apparatus comprising a central processing unit (CPU), a first memory unit which performs communication with the CPU, and a second memory unit which stores therein conditional access system (CAS) software and platform software, may be provided, in which the control method may include upon booting, copying the CAS software to an internal memory area, and copying the platform software to the first memory unit and executing the software, and executing CAS operation through communication between the CAS software and the platform software.

The second memory unit may additionally store therein driver software, and executing the CAS operation may include copying, at the CPU, the driver software to the first memory unit and then performing communication between the CAS software and the platform software through the driver software.

The CAS software may be implemented with encryption and electronic signature.

The control method may additionally include, after the CPU decrypts the CAS software and verifies integrity through verification of the electronic signature, copying to the internal memory area.

The driver software may have an electronic signature. After the CPU copies the driver software to the first memory unit, the control method may additionally include verifying integrity through verification of the electronic signature.

The first memory unit may be a random access memory (RAM), and the second memory unit may be a non-volatile memory.

The internal memory area may be a secure random access memory (RAM) area inside the CPU.

The electronic apparatus may be implemented as a set-top box.

In one exemplary embodiment, a recording medium having stored therein a program code to execute a control method of an electronic apparatus comprising a central processing unit (CPU), a first memory unit which performs communication with the CPU, and a second memory unit which stores therein conditional access system (CAS) software and platform software, may be provided, in which the control method of the electronic apparatus may include upon booting, copying the CAS software to an internal memory area, copying the platform software to the first memory unit and executing the software, and executing CAS operation through communication between the CAS software and the platform software.

The second memory unit may additionally store therein driver software, and executing the CAS operation may include copying, at the CPU, the driver software to the first memory unit, and then performing communication between the CAS software and the platform software through the driver software.

The CAS software may be implemented with encryption and electronic signature.

The control method of the electronic apparatus may additionally include, after the CPU decrypts the CAS software and verifies integrity through verification of the electronic signature, copying to the internal memory area.

The exemplary embodiments may further include an electronic apparatus, including a first and second memory unit which is configured to communicate with a CPU; and a second memory unit which stores therein conditional access system software and platform software, wherein upon booting, the conditional access system software is copied to an internal memory area of the apparatus, the platform software is copied to the first memory unit, and the conditional access system software are executed through communication between the conditional access system software and the platform software. The internal memory may be within a central processing unit.

The method of the exemplary embodiments may include copying conditional access system software to an internal memory area, copying platform software to a first memory unit and executing the conditional access system and platform software; and executing conditional access system operations through communication between the conditional access system software and the platform software.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
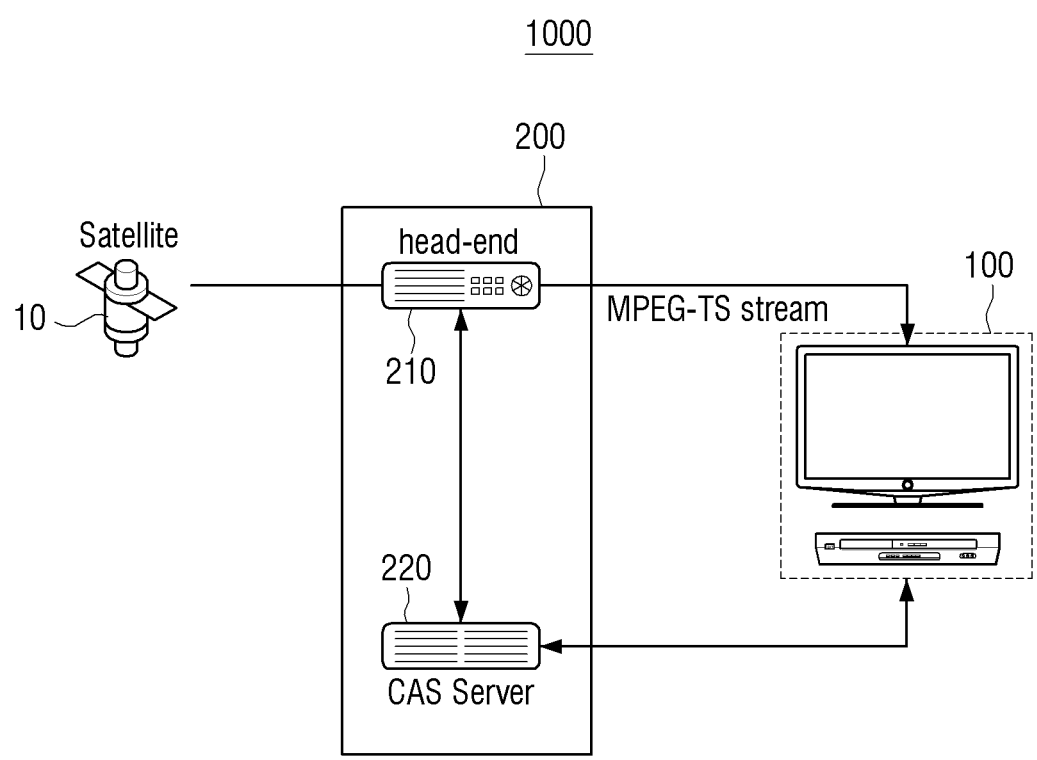
FIG. 1 is a diagram illustrating a Conditional Access System (CAS) according to an exemplary embodiment.

Referring to the drawings, exemplary embodiments of the inventive concept will be described in detail below.

FIG. 1 is a diagram illustrating the Conditional Access System (CAS) according to an embodiment.

Referring to FIG. 1, the CAS 1000 in one exemplary embodiment may include a server 200 and a client device 100. The server 200 may include a head-end 210 and a CAS server 220.

Meanwhile, the CAS 1000 of FIG. 1 may store the CAS software in the client device 100 in advance.

The head-end 210 may include a scrambler (not drawn herein) to scramble broadcasting contents received from a satellite 10 with specific keys.

Meanwhile, the CAS server 220 may encrypt the specific keys utilized in scrambling the broadcasting contents in the head-end 210 to generate ECM. The CAS server 220 may encrypt a service key to decrypt the encrypted specific keys and generate EMM.

Further, the CAS server 220 may encrypt a device key to decrypt the encrypted service key and transmit the encrypted device key to the head-end 210. The CAS server 220 may encrypt the device key by utilizing the previously-known encryption key received from the client device 100, to transmit the device key to the head-end 210.

The head-end 210 may mux ECM, EMM and the device key received from the CAS server 220 with the scrambled broadcasting contents, modulate the muxed results, and generate the Motion Picture Expert Group (MPEG)—Transport Stream (TS). Further, the head-end 210 may transmit the MPEG-TS to the client device 100 by utilizing the coaxial cable.

Although one client device is illustrated in FIG. 1, it may be for one of the exemplary embodiments. The head-end may transmit the data through the coaxial cable to plural client devices.

The client device 100 may store the CAS software to implement the CAS. The CAS software may be received from the CAS provided by the device provider and stored in the client device 100.

Further, the client device 100 may store a security module and a security module bootloader to implement the monitoring function of the security module.

The client device 100 may execute the CAS software to demodulate the data received from the server 200.

Figure 2:
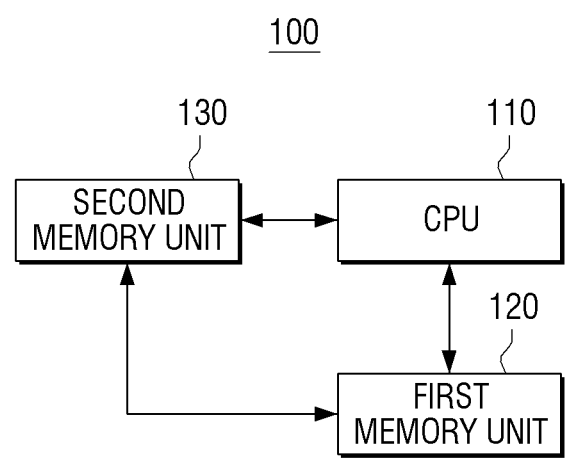
FIG. 2 is a block diagram illustrating an electronic apparatus according to an exemplary embodiment.

FIG. 2 is a block diagram illustrating a structure of an electronic apparatus according to an exemplary embodiment.

Referring to FIG. 2, the electronic apparatus 100 may include a central processing unit (CPU) 110, a first memory unit 120, and a second memory unit 130. The electronic apparatus 100 may be implemented as the client device 100 illustrated in FIG. 1.

The electronic apparatus 100 may be implemented as a set-top box. However, it may be one of the embodiments. Accordingly, the electronic apparatus 100 may be a separate external device including the Digital TV (DTV), the video tape recorder (VTR), the video cassette recorder (VCR), the Digital Video Recorder (DVR), or the DVD player, or may be an internal device included in the DTV, the A/V display apparatus, or another receiving unit.

The CPU 110 may control the overall operation of the electronic apparatus 100. The CPU 110 may copy and store the CAS software stored in the second memory unit 130 to the internal memory area. The internal memory area may be a secure RAM area of the CPU 110.

Further, the CPU 110 may communicate with the first memory unit 120, and verify and execute the copied CAS software in the internal memory area through the platform software running in the first memory unit 120.

As used herein, the platform software may perform the functions of the software by providing commands to various hardware of the electronic apparatus 100, or by inputting the commands to the other software. Further, the CAS software may perform the functions of the CAS by communicating with the platform software.

The first memory unit 120 may communicate with the CPU 110 and temporarily store various software necessary for the operation of the CPU 110. The first memory unit 120 may be a volatile memory including, for example, Random Access Memory (RAM), Dynamic RAM (DRAM), Double-Data-Rate RAM (DDR RAM), Static RAM (SRAM), or Synchronous Dynamic Ram (SDRAM), but is not limited thereto.

The second memory unit 130 may store the CAS software and the platform software. Specifically, the second memory unit 130 may store the CAS software separately from the platform software.

The second memory unit 130 may be a non-volatile memory, but is not limited thereto.

Further, the second memory unit 130 may additionally store driver software. The driver software may be implemented as the interface of the CAS software and the platform software.

The CPU 110 may copy the driver software to the first memory unit 120 and perform communication between the CAS software and the platform software through the driver software.

To be specific, the CPU 110 may verify the driver software through the platform software. If verifying integrity, the CPU 110 may initialize the CAS software and perform communication between the CAS software and the platform software to implement the CAS function.

Meanwhile, the CAS software may be implemented with encryption and electronic signature. The manufacturer of the device may implement signature and encryption with the keys for electronic signature verification during the manufacture of the chips.

The CPU 110 may decrypt the CAS software, verity integrity by examining the electronic signature, and copy the software to the internal memory area. The internal memory area may be the secure RAM in the CPU 110.

Further, the driver software stored in the second memory unit 130 may be implemented with an electronic signature.

In the above example, the CPU 110 may copy the driver software to the first memory unit 120 and verify integrity by examining the electronic signature.

Figure 3:
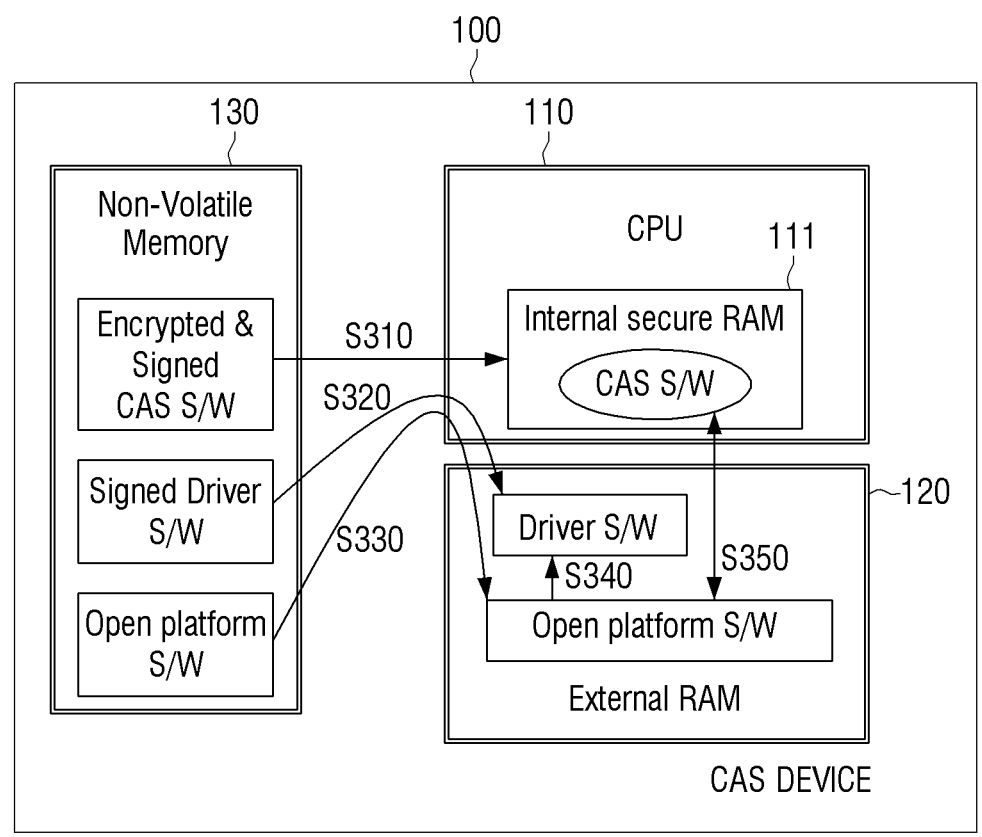
FIG. 3 is a diagram provided to explain interoperation among the constituent elements of the electronic apparatus of FIG. 2.

FIG. 3 is a diagram provided to explain interoperation among the constituent elements illustrated in FIG. 2.

Referring to FIG. 3, in response to the CPU 110 booting up, at S310, the CAS software stored in the second memory unit 130 may be read out and stored in the internal memory area 111. As illustrated, the internal memory area 111 may be the secure RAM.

At S310, the encrypted CAS software with electronic signature in the second memory 130 may be read, and decrypted, and stored in the internal memory area 111 after the electronic signature is verified.

At S320, the CPU 110 may copy the driver software stored in the second memory unit 130 to the first memory unit 110. The driver software may include the electronic signature. The CPU 110 may verify the electronic signature of the driver software and then copy the software to the first memory unit 110. At S330, the open platform software is output to the external RAM 120.

At S340, the CPU 110 may verify the driver software through the platform software executed in the first memory unit 120.

After that, at S350, the CPU 110 may initialize the CAS software copied to the internal memory area of the CPU 110 through the platform software executed in the first memory unit 120, and perform the CAS functions by performing communication among the software. The driver software copied to the first memory unit 120 may be utilized as an interface.

Figure 4:
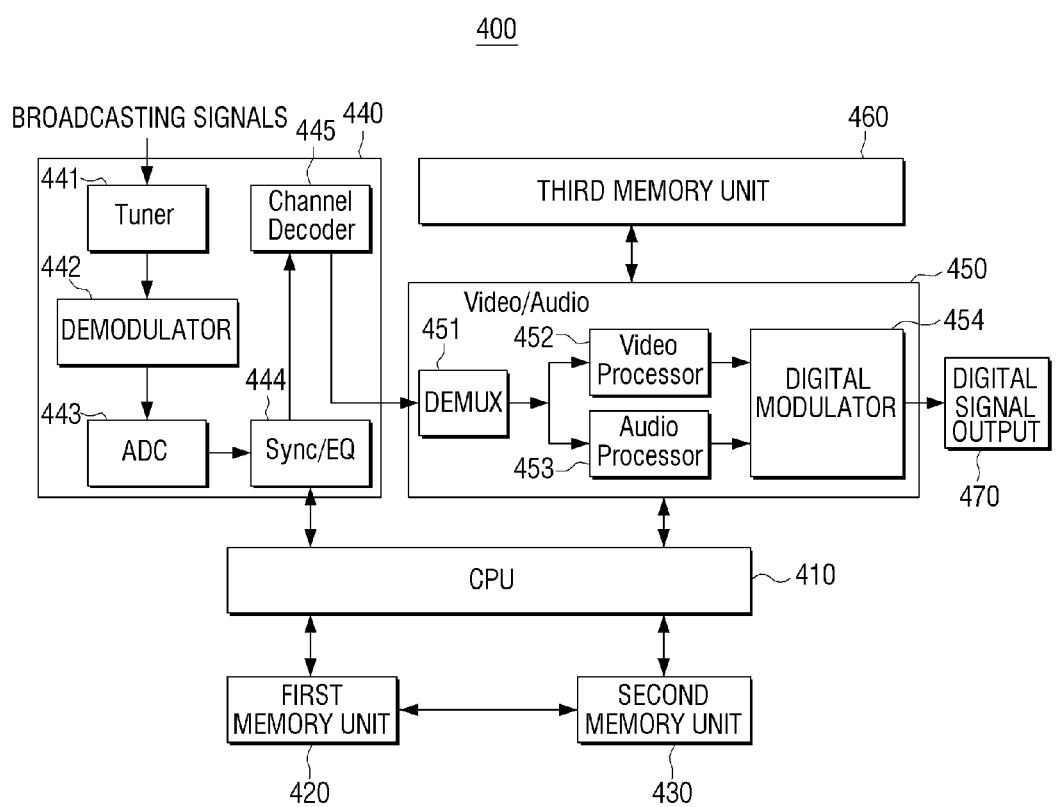
FIG. 4 is a block diagram illustrating an electronic apparatus according to an exemplary embodiment.

FIG. 4 is a block diagram illustrating an electronic apparatus according to an exemplary embodiment.

Referring to FIG. 4, the set-top box 400 implemented as the electronic apparatus 100 will be described in detail below.

Referring to FIG. 4, the set-top box 400 may include a CPU 410, a first memory unit 420, a second memory unit 430, a signal receiving unit 440, a signal processing unit 450, a third memory unit 460, and a digital signal output unit 470.

The CPU 410 may control the overall operation of the set-top box 400. To be specific, upon booting up, the CPU 410 may copy and store the CAS software stored in the second memory unit 430 to the internal memory area. The internal memory area may be the secure RAM of the CPU 410.

Further, the CPU 410 may copy the platform software stored in the second memory unit 430 to the first memory unit 420 and execute the platform software.

Further, the CPU 410 may copy the driver software stored in the second memory unit 430 to the first memory unit 420, and perform communication between the CAS software and the platform software through the driver software.

The first memory unit 420 may communicate with the CPU 410 and temporarily store the various software necessary for the operation of the CPU 410. The first memory unit 420 may be a volatile memory.

The second memory unit 430 may store the CAS software and the platform software. The second memory unit 430 may be a non-volatile memory.

Further, the second memory unit 430 may additionally store therein the driver software. The driver software may interface between the CAS software and the platform software.

Accordingly, the CPU 410 may copy the driver software to the first memory unit 420 and perform communication between the CAS software and the platform software through the driver software.

The signal receiving unit 440 may receive the broadcast signals of the ground wave broadcast cable broadcast, or the satellite broadcast. The broadcast signals may be received in at least one of the analog and the digital methods. The digital method may be Quadrature Amplitude Modulation (QAM), Orthogonal Frequency Division Multiplexing (OFDM), Vestigial Side Band (VSB), and Quadrature Phase Shift Keying (QPSK).

The VSB may be the Advanced Television Systems Committee (ATSC) system of the United States, the DVB-T system of Europe based on the Coded Orthogonal Frequency Modulation (COFDM), the ISDB-T system of Japan based on the Bandwidth Segmented Transmission-OFDM (BST-OFDM), the Terrestrial Digital Multimedia Television Broadcasting (DMB-T) of China, the Advanced Digital Television Broadcast-Terrestrial (ADTB-T), the BDB-T, the CDTB-T, the Synchronized Multi-Carrier CDMA (SMCC), or other transmitting methods.

When the broadcast signals are received through the antenna, the signal receiving unit 440 may synchronize a specific kind of broadcast signals including the digital broadcast signals, the analogue broadcasting signals, or the digital broadcast signals. That is, the signal receiving unit 440 is capable of receiving and modulating the desired broadcast signals. Further, the signal receiving unit 440 may digitize the modulated analog signals and output the digital signals.

The signal receiving unit 440 may output the signals of the channel selected by the user through the external interface under the control of the CPU 410.

To this purpose, the signal receiving unit 440 may include some or all of a television tuner module 441, a demodulator 442, an Analog Digital (AD) converter 443, a synchronizer/equalizer 444, and a channel decoder 445.

The tuner module 441 may include a tuner which synchronizes a specific kind of the broadcast signals and outputs the resultant signals.

The demodulator 442 may demodulate the broadcast signals provided via the tuner.

Further, the AD converter 443 may transform the information received via the demodulater. The synchronizer/equalizer 444 may synchronize the channel selected by the user, and compensate for the distortion of the channel. The synchronizer/equalizer 444 may be operated under the control of the CPU 410.

The signal processing unit 450 may receive the broadcast signals of the channel provided from the signal receiving unit 440, and separate the received signals into the video and audio data. The video and audio data may be stored in the third memory unit 460 under the control of the CPU 410. Further, the signal processing unit 450 may manage the video and audio data through use of the microprocessing unit, if such as provided. The microprocessing unit may receive the video and audio data and store the data in the third memory unit 460, or may read the stored data and process the signals. The signal processing may include decoding, scaling, or interpolating frames.

Further, the signal processing unit 450 may modulate the broadcasting signals to the digital channel format and output the modulated digital signals 470. The signal processing unit 450 may standardize the broadcasting signals in the national digital format of a predetermined country. For instance, according to the ATSC standard, the video and audio data may be modulated in the digital channel such as QAM, VSB, QPSK, and OFDM, and provided to the digital signal output unit 470.

To this purpose, the signal processing unit 450 may include a demux 451, video and audio processing units 452 and 453, and a digital modulator 454. The demux 451 may receive the broadcast signals of the selected channel, store the received broadcast signals in association with the third memory unit 460, separate the video and audio data of the selected channel program, and provide the data to the video processing unit 452 and the audio processing unit 453.

The video and audio processing unit 452 and 453 may process the signals of the received video and audio data. Processing the signals may include decoding, scaling, or interpolating frames.

Further, the digital modulator 454 may modulate and output the broadcast signals in the digital format by utilizing at least any one of QAM, VSB, OFDM, and QSPK. The digital modulator 454 may standardize the received broadcast signals according to the specific digital format.

The digital signal output unit 470 may output the modulated video and audio data in the digital channel provided from the signal processing unit 450. For instance, the digital signal output unit 470 may be provided in the form of a connector or jack which may connect to another display apparatus such as the digital broadcast receiving unit (not illustrated). As a result, the display apparatus (not illustrated) may receive and display the broadcast signals from the various channels.

Figure 5:
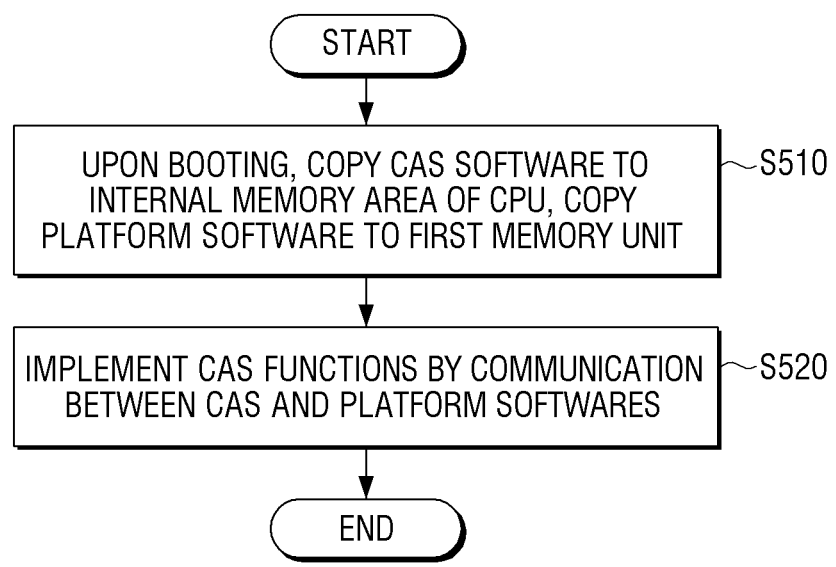
FIG. 5 is a flowchart provided to explain a control method of an electronic apparatus according to an exemplary embodiment.

FIG. 5 is a flowchart provided to explain a control method which controls the electronic apparatus according to an exemplary embodiment.

According to the control method of the electronic apparatus including the CPU, the first memory unit communicating with the CPU, and the second memory unit storing the CAS software and the platform software, at 5510, upon booting, the CAS software may be copied to the internal memory area of the CPU, and the platform software may be copied to the first memory unit and implemented. The internal memory area may be the secure RAM area of the CPU. Further, the electronic apparatus may be implemented as a set-top box, which is merely one of the exemplary embodiments.

At S520, the CPU may perform the CAS functions through communication between the CAS software and the platform software.

The second memory unit may additionally store the driver software, and at S510, the performing of the CAS functions may include copying, at the CPU, the driver software to the first memory unit and performing communication between the CAS software and the platform software through the driver software.

The CAS software may be encrypted and electronically signed.

Further, the CPU may additionally decrypt the CAS software, verify integrity by examining the electronic signature, and copy the software to the internal memory of CPU 410.

Further, the driver software may be electronically signed. The CPU may copy the driver software to the first memory unit 420 and verify integrity by examining the electronic signature.

The first memory unit 420 may be the RAM, and the second memory unit 430 may be a non-volatile memory.

Further, an embodiment may include a computer-readable recording medium which includes a program implementing the control method of the electronic apparatus. The computer-readable recording medium may include every type of the recording medium in which the data that can be read by the computer system are stored. For instance, the computer-readable recording medium may be a ROM, a RAM, a CD-ROM, the electromagnetic tape, the floppy disk, and the optical data storage. Further, the computer-readable recording medium may be distributed in the computer system that the network is connecting, and the codes that can be read by the computer according to the distribution method may be stored and implemented.

According to the present inventive concept, the platform provider may open and provide the environment developing the platform software to developers or managers.

Further, because the CAS software may be executed in the internal CPU, the security against hacking, forgery and falsification can be enhanced, compared to the environment that the CAS software is executed in the RAM.

Further, because the platform software can be developed simply by matching with the driver software, which is the secure RAM interface, the scope and complexity of implementing the CAS software may be reduced compared to the conventional systems.

Further, the bootloader of the CAS device may be manufactured and modulated in a wider and freer scope.

Further, because the CAS software may be encrypted and stored in a non-volatile memory, security against the hacking, forgery and falsification can be enhanced.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:
1. An electronic apparatus, comprising:
a central processing unit (CPU);
a first memory unit configured to communicate with the CPU; and
a second memory unit configured to separately store therein conditional access system (CAS) software and platform software, wherein upon booting, the CPU is configured to copy the CAS software to an internal memory area, copy the platform software to the first memory unit and execute the platform software, and execute CAS operations through communication between the CAS software copied to the internal memory area and the platform software copied to the first memory, wherein the internal memory area is a secure RAM (SRAM) area inside the CPU, and is a distinct hardware memory from the first memory unit, wherein the second memory unit further stores therein driver software having an electronic signature, and wherein the CPU copies the driver software to the first memory unit, verifies integrity of the driver software through verification of the electronic signature, and performs communication between the CAS software and the platform software through the verified driver software.

2. The electronic apparatus of claim 1, wherein the CAS software is implemented with encryption and another electronic signature.

3. The electronic apparatus of claim 2, wherein the CPU decrypts the CAS software, verifies integrity of the CAS software through verification of the other electronic signature, and then copies the decrypted software to the internal memory area.

4. The electronic apparatus of claim 1, wherein the first memory unit is a random access memory (RAM), and the second memory unit is a non-volatile memory.

5. The electronic apparatus of claim 1, wherein the electronic apparatus is implemented as a set-top box.

6. A method of controlling an electronic apparatus comprising a central processing unit (CPU), a first memory unit which performs communication with the CPU, and a second memory unit which separately stores therein conditional access system (CAS) software and platform software, the control method comprising:

upon booting, copying the CAS software to an internal memory area, copying the platform software to the first memory unit and executing the CAS and platform software; and executing CAS operations through communication between the CAS software copied to the internal memory area and the platform software copied to the first memory unit, wherein the internal memory area is a secure RAM (SRAM) area inside the CPU, and is a distinct hardware memory from the first memory unit, wherein the second memory unit further stores therein driver software having an electronic signature, and wherein the executing of the CAS operation comprises copying, at the CPU, the driver software to the first memory unit, verifying integrity of the driver software through verification of the electronic signature, and performing communication between the CAS software and the platform software through the verified driver software.

7. The control method of claim 6, wherein the CAS software is implemented with encryption and another electronic signature.

8. The control method of claim 7, further comprising, after the CPU decrypts the CAS software and verifies integrity of the CAS software through verification of the other electronic signature, copying the decrypted software to the internal memory area.

9. The control method of claim 6, wherein the first memory unit is a random access memory (RAM), and the second memory unit is a non-volatile memory.

10. The control method of claim 6, wherein the electronic apparatus is implemented as a set-top box.

11. A non-transitory computer readable recording medium having stored therein a program code wherein the program code, when executed on a processor, causes the processor to execute a method of controlling an electronic apparatus comprising a central processing unit (CPU), a first memory unit which performs communication with the CPU, and a second memory unit which separately stores therein conditional access system (CAS) software and platform software, wherein the method of controlling the electronic apparatus comprises:

upon booting, copying the CAS software to an internal memory area, and copying the platform software to the first memory unit and executing the software; and executing the CAS operation through communication between the CAS software copied to the internal memory area and the platform software copied to the first memory, wherein the internal memory area is a secure RAM (SRAM) area inside the CPU, and is a distinct hardware memory from the first memory unit, wherein the second memory unit further stores therein driver software having an electronic signature, and the executing of the CAS operation comprises copying, at the CPU, the driver software to the first memory unit, verifying integrity of the driver software through verification of the electronic signature, and performing communication between the CAS software and the platform software through the verified driver software.

12. The recording medium of claim 11, wherein the CAS software is implemented with encryption and another electronic signature.

13. The recording medium of claim 12, wherein the control method of the electronic apparatus further comprises, after the central processing unit decrypts the CAS software and verifies integrity of the CAS software through verification of the electronic signature, copying the CAS software to the internal memory area.

14. An electronic apparatus, comprising:
a first memory unit configured to communicate with a central processing unit (CPU); and
a second memory unit configured to communicate with the CPU and separately store therein conditional access system (CAS) software and platform software, wherein
upon booting, the electronic apparatus is configured to copy CAS software to an internal memory area of the apparatus, copy the platform software to the first memory unit, and execute the CAS software through communication between the CAS software copied to the internal memory area and the platform software copied to the first memory,
wherein the internal memory area is a secure RAM (SRAM) area inside the CPU, and is a distinct hardware memory from the first memory unit,
wherein the second memory unit further stores therein driver software having an electronic signature, and
wherein the electronic apparatus copies the driver software to the first memory unit, verifies integrity of the driver software through verification of the electronic signature, and performs communication between the CAS software and the platform software through the verified driver software.

15. A method of controlling an electronic apparatus, the method comprising:
- copying conditional access system (CAS) software to an internal memory area,
- copying platform software to a first memory unit separate from the internal memory area and executing the CAS and platform software; and
- executing CAS operations through communication between the CAS software copied to the internal memory area and the platform software copied to the first memory unit,
- wherein the internal memory area is a secure RAM (SRAM) area inside a CPU of the electronic apparatus, and is a distinct hardware memory from the first memory unit,
- wherein the electronic apparatus further stores therein driver software having an electronic signature, and
- wherein the executing of the CAS operation comprises copying, at the CPU, the driver software to the first memory unit, verifying integrity of the driver software through verification of the electronic signature, and performing communication between the CAS software and the platform software through the verified driver software.

* * * * *